United States Patent [19]

Trevisani

[11] Patent Number: 5,173,027
[45] Date of Patent: Dec. 22, 1992

[54] AUTOMATED PARKING SYSTEM AND SUBASSEMBLIES THEREFOR

[75] Inventor: Davide Trevisani, Cesena, Italy
[73] Assignee: Soilmec S.p.A., Cesena, Italy
[21] Appl. No.: 665,898
[22] Filed: Mar. 7, 1991
[30] Foreign Application Priority Data Mar. 9, 1990 [IT] Italy ................ 67165 A/90

[51] Int. Cl.⁵ .............................. E04H 6/20
[52] U.S. Cl. .................... 414/257; 414/235; 414/241; 414/263
[58] Field of Search ............ 414/253, 257, 261, 263, 414/234, 235, 241

[56] References Cited

U.S. PATENT DOCUMENTS

| | | | |
|---|---|---|---|
| 1,828,307 | 10/1931 | Been | 414/253 |
| 2,691,448 | 10/1954 | Loatz | 414/263 X |
| 2,791,338 | 5/1957 | Thaon de Saint-Andre | . |
| 3,439,815 | 4/1969 | Wagner et al. | 414/263 X |
| 3,756,432 | 9/1973 | McCreary | 414/257 X |
| 4,039,089 | 8/1977 | Kochanneck | 414/263 X |
| 4,170,310 | 10/1979 | Bajulaz | 414/241 |
| 4,264,257 | 4/1981 | Saurwein | 414/263 X |
| 4,265,581 | 5/1981 | Ives et al. | 414/263 X |
| 5,024,571 | 6/1991 | Shahar et al. | 414/263 X |
| 5,049,022 | 9/1991 | Wilson | 414/253 |
| 5,083,891 | 1/1992 | Takahiro | 414/257 |

FOREIGN PATENT DOCUMENTS 1171504 1/1959 France .
2223538 10/1974 France .

*Primary Examiner*—Michael S. Huppert
*Assistant Examiner*—James Keenan
*Attorney, Agent, or Firm*—Merchant, Gould, Smith, Edell, Welter & Schmidt

[57] ABSTRACT

An underground circular and non circular parking place where vehicle parking areas are obtained and arranged radius-like on several underground stories. Vehicles are fed to the areas by a lift truck which moves vertically from ground story to the lower story and simultaneously rotates around a vertical axis together with the whole bearing column, to reach all parking areas; on ground story the lift truck is a continuity element with an incoming and an outgoing area; the lift truck consists of a platform on which an upper plane moves in two opposite directions, the plane has two pairs of chains abreast equipped with staves for motor-car supporting and hooking lists to avoid sliding; the ends of the plane are equipped with a mechanism for engaging with a corresponding mechanism in ground areas and underground spaces; the areas and spaces are also equipped with pairs of chains abreast and staves for motorcar support; a first motor for moving the plane in the two directions with respect to the platform are assembled and a second motor for rotating the chains of the plane and the chains of the parking area or underground space to which the plane is temporarily connected.

2 Claims, 5 Drawing Sheets

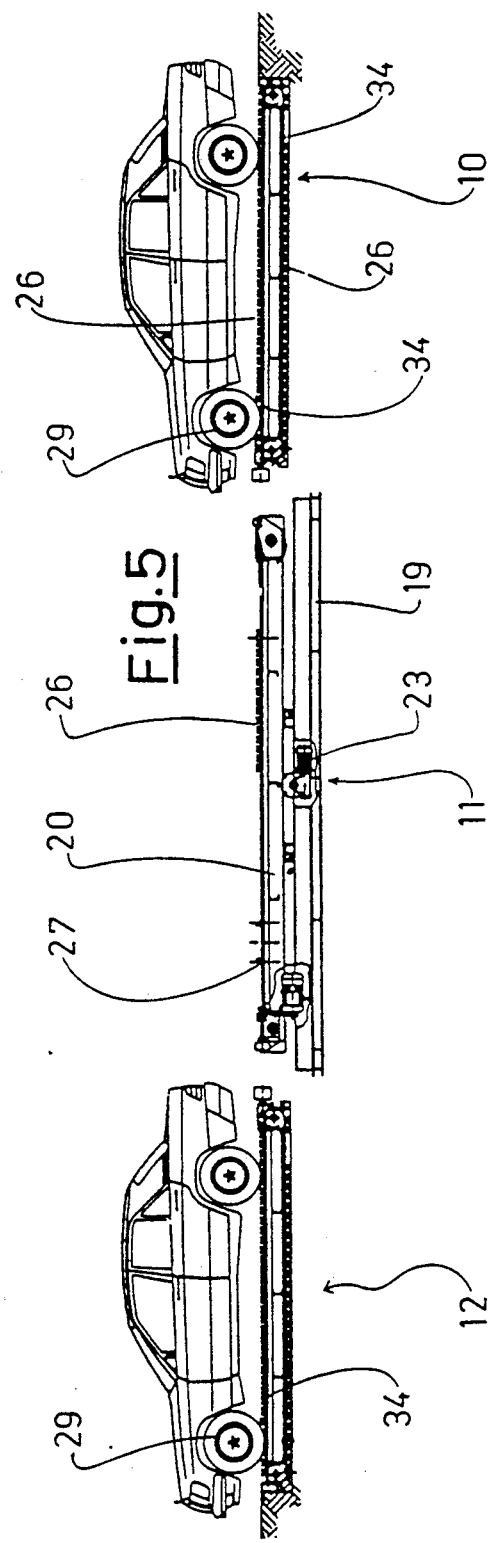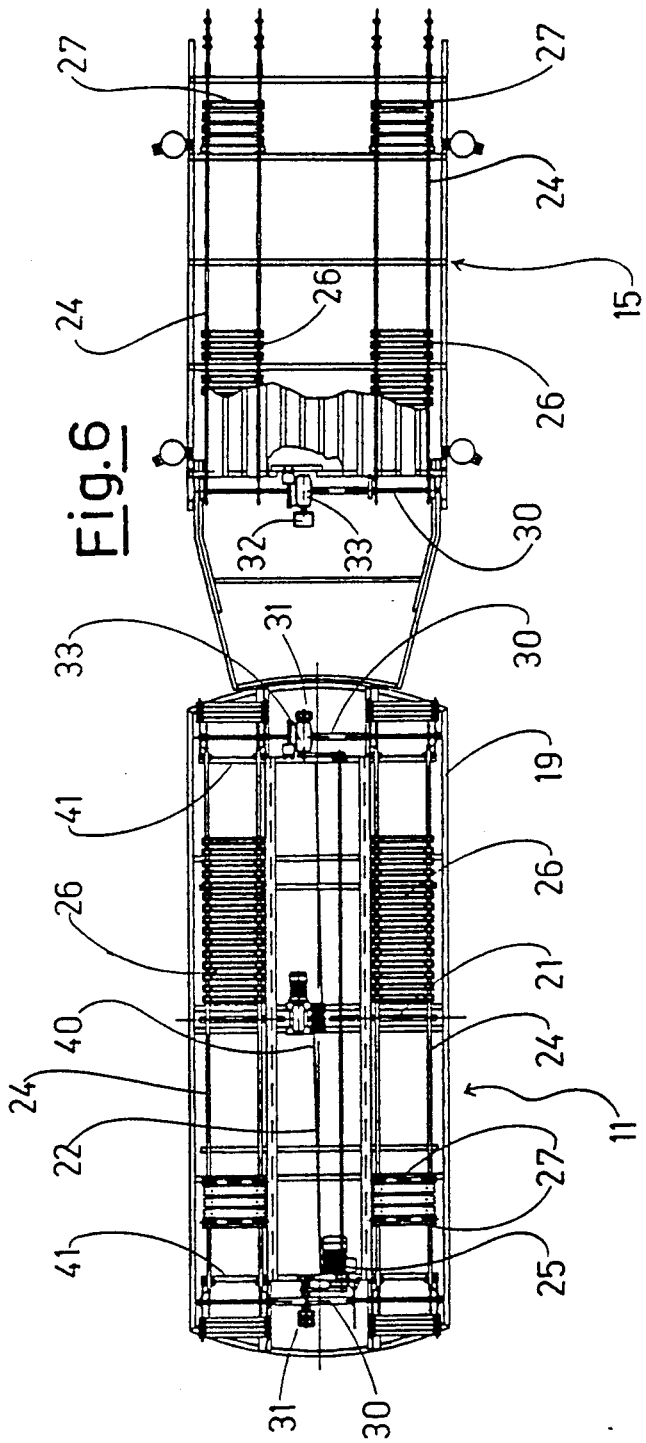

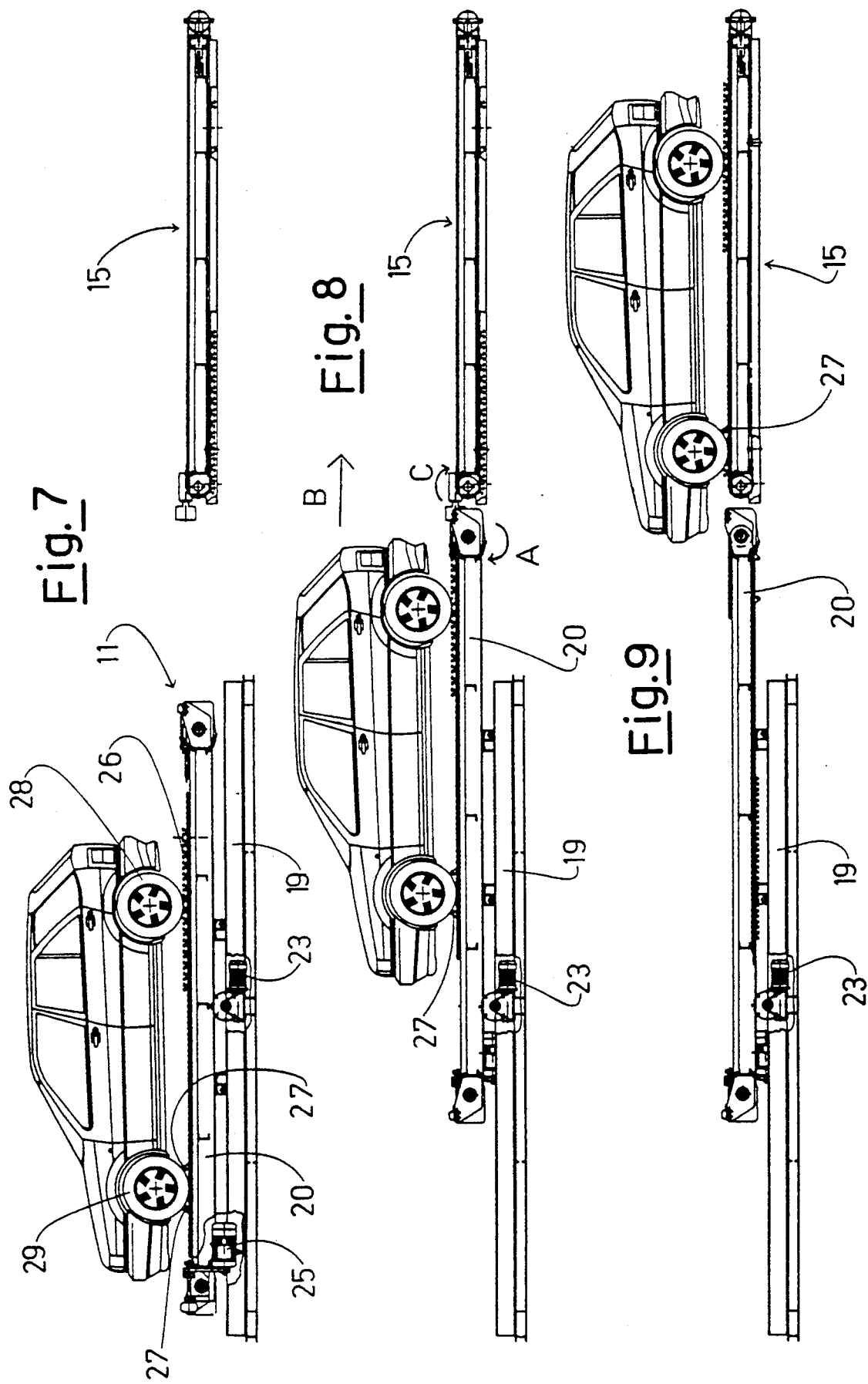

AUTOMATED PARKING SYSTEM AND SUBASSEMBLIES THEREFOR

BACKGROUND OF THE INVENTION

Field of the Invention

The invention regards an underground circular and non-circular parking place, or one having variable radius.

Underground parking places have become lately very popular in the most crowded cities. This is due to problems deriving from lack of space which impedes the realization of ground parking places and also to the fact that underground parking places do not disturb the surroundings and enable an adequate layout of a remarkable number of motorcars.

One version of an underground parking place is a circular underground parking place consisting of a certain number of circular-shaped underground stories where motorcars are arranged radius-like on each story.

A vertically movable platform, stopping at each underground story and on the ground level, provides the transfer of the motorcars in and out of the parking place.

However, some inconveniences are noted with the type of parking places now existing. Some of them require ground structures which emphazise and even increase their overall dimensions, not allowing a complete integration into the surroundings.

Some parking places have complex systems for drawing and storing motorcars which make the installation very expensive and subject to frequent breakdowns. Furthermore, the complexity of the systems impedes the operation of the installation at sufficient speed in order to cope with the incoming and outgoing motorcar traffic. This latter feature is very important as there is one platform for the transfer of the motorcars to and from the parking place and the ground, so it must be able to operate rapidly to avoid queuing up outside the parking place. It follows that the drawing and transfer system of the motorcars is quite complex and complicated and this is detrimental to the rapidity of the operations.

SUMMARY OF THE INVENTION

One of the objects of the invention is to propose an underground circular and non-circular parking place, able to integrate perfectly into the surroundings and having minimum dimensions on the ground level.

It is also an object of the invention to propose an extremely simple and reliable motorcar drawing and transfer system to obtain high transfer speed and thus quick operating cycles in the system.

For these and other purposes which will be better appreciated as the description follows, the invention proposes the realization of an underground circular and non-circular parking place where vehicle parking areas are obtained and arranged radius-like, or parts thereof, on several underground stories. Vehicles are fed to the parking areas by a lift truck which moves vertically from ground story to the lower story and simultaneously rotates around a vertical axis together with the whole bearing column, to reach all parking areas. On the ground story, the lift truck is a continuity element with an incoming and an outgoing area, wherein the lift truck consists of a platform on which an upper plane moves in two opposite directions, said plane has two pairs of chains abreast equipped with staves for motorcar supporting and hooking lists to avoid sliding. The ends of said plane are equipped with engaging means which correspond to the means on the ground areas and underground spaces. The parking areas and spaces are also equipped with pairs of chains abreast and staves for motorcar support. First motor means to move the plane in the two directions with respect to the platform are assembled and second motor means to rotate the chains of the plane and the chains of the parking area or underground space to which the place is temporarily connected by means of said engaging means.

BRIEF DESCRIPTION OF THE DRAWINGS

The parking place of the invention is now described and reference is made to the attached drawings, as follows:

FIG. 5 is the longitudinal section of the parking areas and of the parking lift truck on ground story;

FIG. 6 is the plan view of FIG. 7;

FIGS. 7, 8 and 9 are section views of the parking place during some operating conditions;

DETAILED DESCRIPTION OF THE PREFERRED EMBODIMENT

The underground circular and non-circular parking place has an entry area 10 on the ground (FIG. 1), a lift truck 11 and an exit area 12 arranged in line or inclined.

Figure 11:
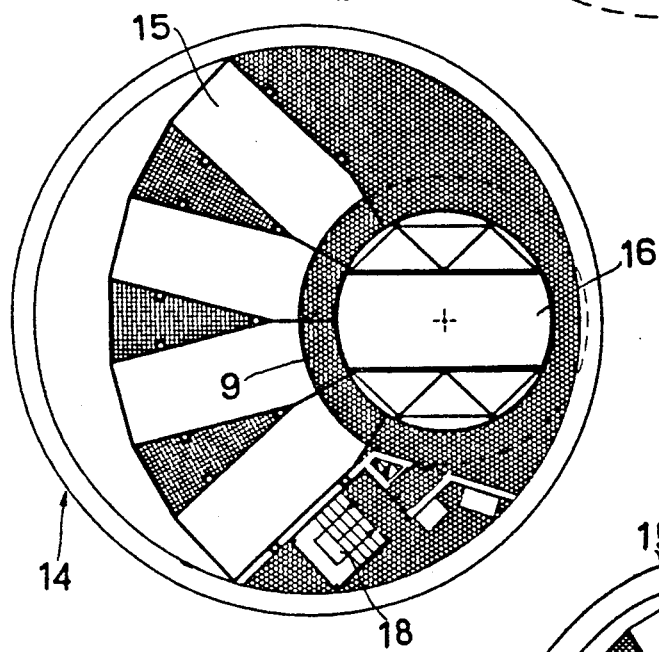
FIGS. 11 and 12 are views of further variants of FIG. 2.

In the underground (FIG. 2) the parking garage has a plurality of stories 14, substantially circular, where radius-like, or part thereof, motorcar parking areas 15 (FIG. 11 and 12) are obtained; a free circular passage 9, which may be reached by stairs 18, is obtained in the inner part of the areas.

Figure 3:
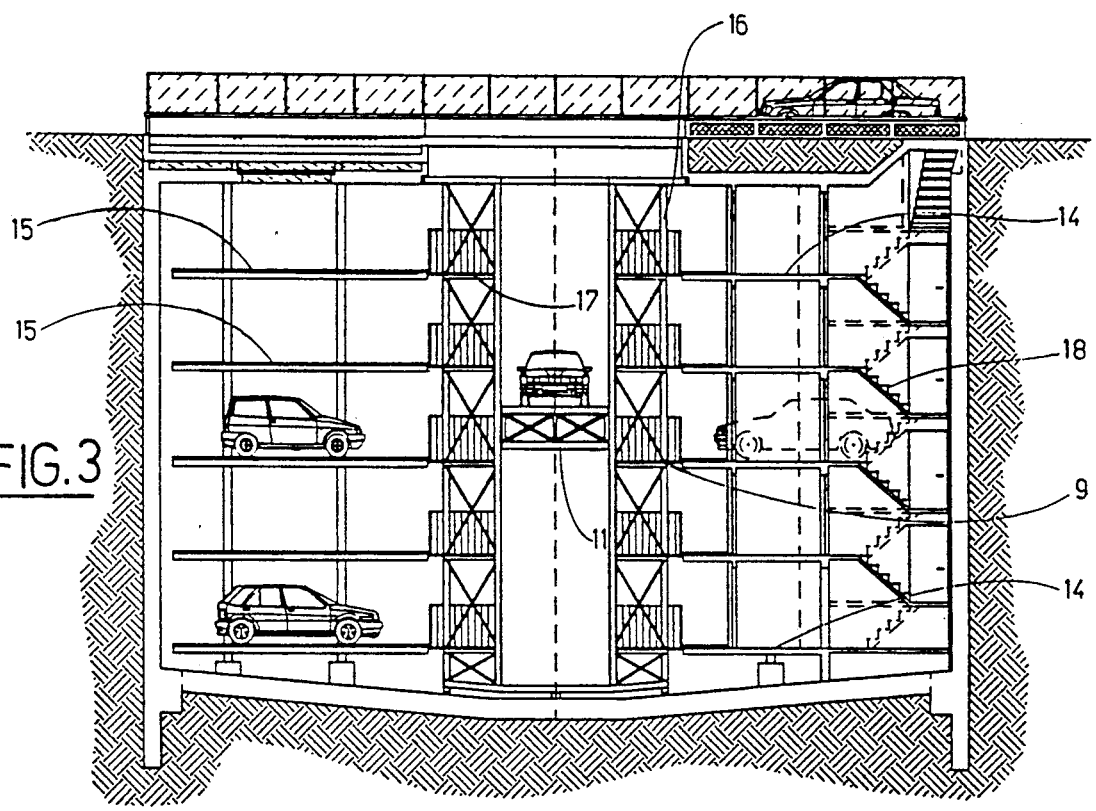
FIGS. 3 and 4 are sections of the parking place during two different operating stages of the lift truck and its bearing column while transferring motorcars.
Figure 4:
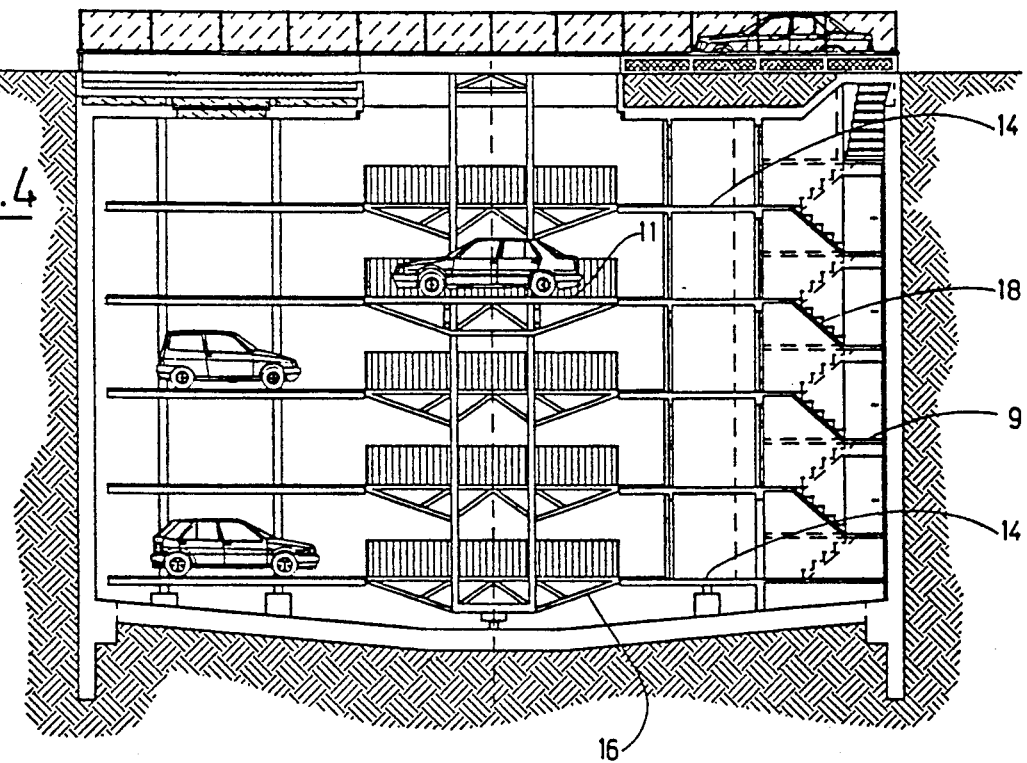

A circular column 16 rotating around its vertical axis (FIG. 3 and 4) is the center of the parking place.

The lift truck 11 which takes the motorcars to the selected stories 14 and to the respective parking areas 15 moves vertically in said column.

A stair 18 enables the persons in charge of the parking place to reach the various stories from the exterior by means of the passage 9 to the rotating column, obtained in each story.

The lift truck 11 consists of a platform 19 on which a plane 20 is slidably assembled. Platform 19 carries a crosspiece 21 (FIG. 6) on which a drum 40 is assembled, on which cable 22 is wound; the ends of said cable are secured to two crosspieces 41 of plane 20. A motor 23 gives rotation to drum 40 in the two directions causing the sliding of plane 20 in the two opposite directions with respect to platform 19.

Two pairs of chains 24 are assembled on plane 20 and are operated by a motor 25; said chains carry two rows abreast of staves 26 and two pairs of lists 27. The staves form a support surface for the back wheels 28 of the motorcar (FIG. 7 and 8), while lists 27 realize support and constraint for the front wheels 29 of the motorcar against the sliding of the motorcar on plane 20.

Figure 1:
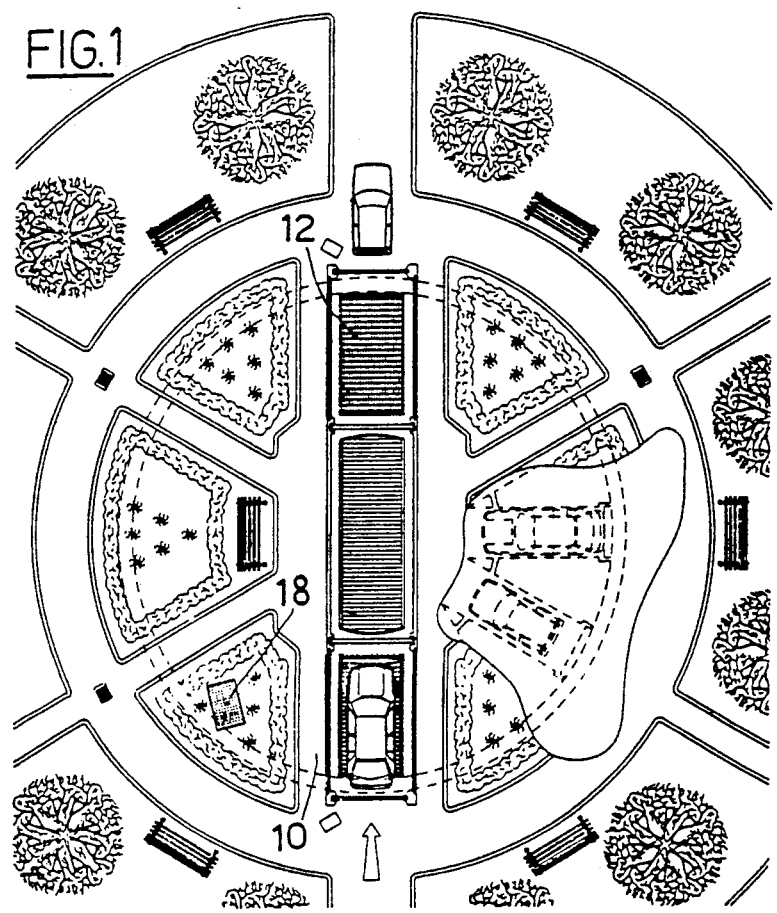
FIG. 1 is the ground view of the parking place.

On the ground the lift truck 11, as mentioned, is located between an entry area 10 and an exit area 12 (FIGS. 1 and 5). Both of said areas, as well as underground radial parking areas (FIG. 2), have a frame structure equipped with two pairs of chains, such as chains 24 of plane 20, on which the staves 26 are constrained crosswise; said staves cover the whole extent of the entry areas 10 and exit areas 12 (FIG. 5) and part of parking areas 15 (FIGS. 6-9). Please note to this regard (FIG. 5) that, unlike parking areas 15, areas 10 and 12 have the double possibility of motorcar loading/unloading in the whole extent of the staves, that is after said operations lower staves 25 and section 34 are located in an upper position able to receive the subsequent car immediately.

Areas 10 and 12 and parking areas 15 each have a pair of chains 24 wound on a shaft 30. The drum 32 is connected to the shaft 30 by a reduction unit 33.

Operating in conjunction with said drum 32 the lift truck is equipped with an air friction clutch 31, the rotation of which is given by a motor 25; said clutch is engaged in the drum 32, which is connected to shaft 30 by reduction unit 33, when plane 20 is moved against a parking area 15 (FIGS. 8 and 9) or an entry or exit area.

The air friction clutch 31, FIG. 6 at right, is rigidly connected to an equal clutch 31 placed on the opposite side of the plane 20 so that plane 20 may engage any type of area from both sides.

As clutch 31 is rotated by motor 25 which operates chains 24 of plane 20, chains 24 of parking area 15 or of areas 10 or 12 are rotated in the same instant by said motor 25 as soon as clutch 31 and drum 32 are engaged to each other.

The following will be the operating sequence: when the motorcar is on the lift truck 11 (FIG. 7) and must be taken to one of the radial and underground areas 15, motor 23 is operated to take plane 20 in contact with opening 15. Motor 25 operates simultaneously, rotating shaft 30 of the plane 20 thus taking the staves in the contact area with opening 15.

Having reached that position, clutch 31 engages itself in the drum 32, motor 25 continues to rotate chains 24 of plane 20 in the direction of arrow A (FIG. 8) and then the motorcar moves in direction B; in the meantime, shaft 30 and chains 24 of space 15 with it will rotate in the direction of arrow C.

Figure 2:
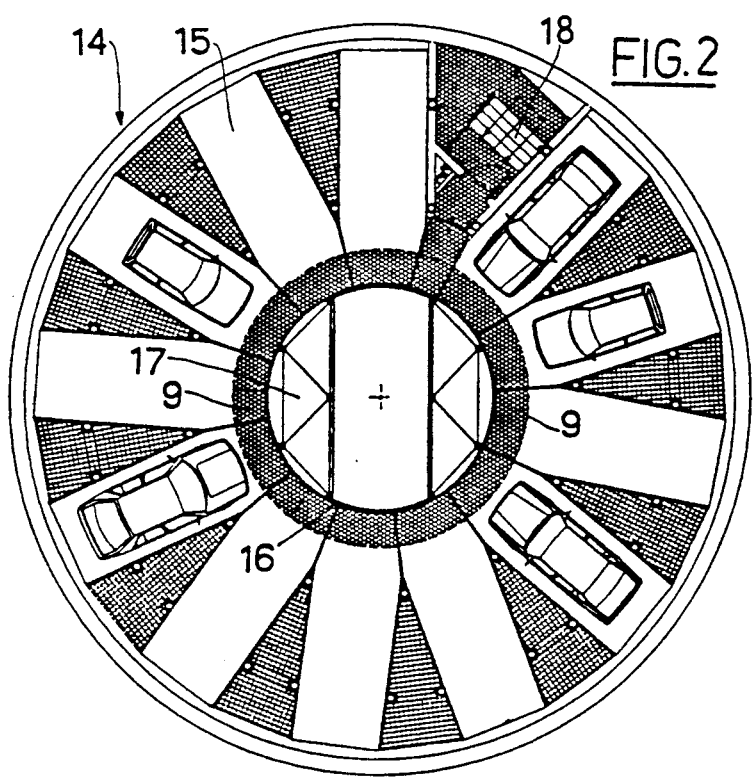
FIG. 2 is the view of an underground story of the parking place.

At the end of said operation the motorcar has been positioned as shown at FIG. 9, held by lists 27 on one of the parking areas 15 of the underground parking as illustrated in FIG. 2.

When plane 20 is back to platform 19 in right position, the lift truck may return to the ground where the entry and exit areas 10 and 12 are located (FIG. 5).

Areas 10 and 12, unlike underground areas 15, are equipped with staves 26 extending for the entire length of the respective pairs of chains with the exception of a small section 34 as housing of front wheel 29 of motorcars; said housing determines the exact position of the vehicle to avoid motorcar incoming and outgoing problems, the lift truck is present to draw and leave the car automatically.

Both areas 10 and 12 have drums 32 engaging in clutches 31 of the lift truck (FIG. 6) and so have the underground parking areas.

When motor 25 rotates chains 24 of the lift truck 11 and of areas 10 or 12 to which it is temporarily connected, the lists 27 will receive front wheel 29 from area 10 or will unload front wheel 29 on area 12 as their position on the lift truck 11 and on entry/exit/parking areas is adequately set and synchronized to carry out said operations automatically.

It will be easily appreciated that this invention is extremely simple and highly reliable from the construction point of view. Furthermore, structures on ground which normally disfigure the surroundings are not required.

Figure 10:
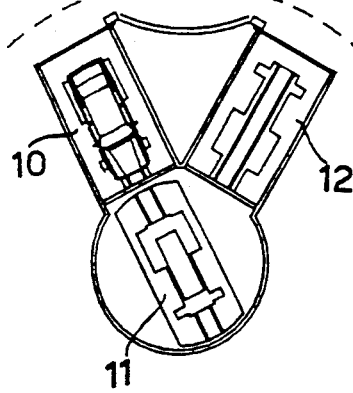
FIG. 10 is the schematic view of a variant of FIG. 1.

In some cases it may be necessary or suitable to arrange entry and exit areas 10 and 12 as schematically illustrated in FIG. 10, that is radius-like with respect to central lift truck 11 and not in line as illustrated in FIG. 1.

The position of the areas 10 and 12 with respect to the lift truck is not relevant as the lift truck 11 is equipped with engaging means in said areas on both sides, therefore they may be arranged at any angle between each other without modifying the installation.

Figure 12:
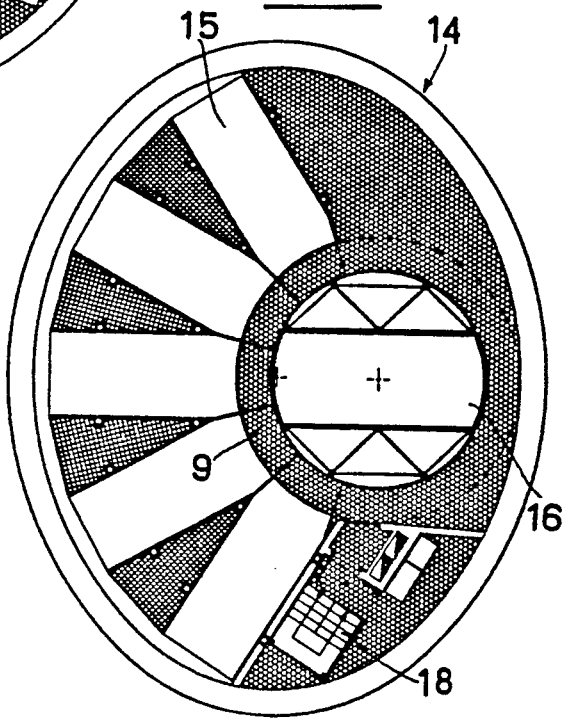

The same applies to the case where the stories 14 of the parking place have the column 16 eccentric with respect to the circular hole of the ground (FIG. 11) or when the hole is not circular but oval shaped (FIG. 12).

In both above cases it may be noted that the parking areas 15 will obviously be fewer than the ones of a circular parking place (FIG. 12); column 16 and lift truck 11, nevertheless, will be the same as those illustrated in FIGS. 1-9.

I claim:

1. A substantially circular underground parking place having a center, a ground level with an entry and an exit area for vehicles, and several lower stories where a plurality of vehicle parking areas are arranged along radii extending from the center of the parking place on each story, comprising:

a lift truck with a rotating bearing column located substantially in the center of the parking place which moves vehicles vertically between the ground level to the lower stories and rotates around a vertical axis defined by said bearing column, whereby all parking areas and the entry and exit areas are accessible from said lift truck;

a platform attached to said lift truck for retaining vehicles, said platform having an upper plane with a first and second end which moves in a first and a second direction along a horizonal axis, said upper plane further having a first pair of rotating chains attached to moveable staves for moving the vehicle in said first and second directions along said horizonal axis and hooking lists to avoid sliding of the vehicle;

first engaging means on said first and second ends of said upper plane in mechanical communication with said first pair of rotating chains;

a plurality of frame structures spatially separated from said lift truck and said platform for supporting the vehicles at said parking areas and at said entry and exit areas, said frame structures having a second pair of rotating chains attached to moveable staves, said moveable staves designed to move a vehicle in a direction along said horizonal axis of said upper plane, said frame structure further including a second engaging means in mechanical communication with said second pair of rotating chains and positioned opposite said first engaging means;

first motor means for moving said upper plane in said first and second directions along said horizonal axis with respect to said platform to abut one of said frame structures and for temporarily connecting said first and second engaging means; and second motor means for moving said first pair of rotating chains on said frame structure at said upper plane, said second motor means also moving said second pair of rotating chains at said parking area and on said entry and exit areas when said first and second engaging means are engaged.

2. Parking place according to claim 1 wherein said first and second engaging means consist of air friction clutches engaging in suitable drums to rotate simultaneously said first and second respective pairs of chains.

* * * * *